(12) United States Patent
Cui et al.

(10) Patent No.: US 12,126,481 B2
(45) Date of Patent: Oct. 22, 2024

(54) METHOD FOR TIME INFORMATION INDICATION

(71) Applicant: ZTE Corporation, Guangdong (CN)

(72) Inventors: Fangyu Cui, Guangdong (CN); Nan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/854,992

(22) Filed: Jun. 30, 2022

(65) Prior Publication Data

US 2022/0337468 A1 Oct. 20, 2022

Related U.S. Application Data

(63) Continuation of application No. PCT/CN2020/107156, filed on Aug. 5, 2020.

(51) Int. Cl.
*H04L 27/26* (2006.01)
*H04J 3/06* (2006.01)
*H04W 56/00* (2009.01)

(52) U.S. Cl.
CPC ........ *H04L 27/2656* (2013.01); *H04J 3/0664* (2013.01); *H04J 3/067* (2013.01); *H04L 27/2657* (2013.01); *H04W 56/001* (2013.01); *H04W 56/003* (2013.01)

(58) Field of Classification Search
CPC .................................................. H04L 27/2656
See application file for complete search history.

(56) References Cited

U.S. PATENT DOCUMENTS

| 11,405,185 B2* | 8/2022 | Sierra ...................... H04L 9/003 |
| 2015/0131628 A1 | 5/2015 | Chu et al. |
| 2016/0227502 A1 | 8/2016 | Vos et al. |
| 2018/0115478 A1* | 4/2018 | Kim ........................ H04L 43/106 |
| 2019/0313357 A1* | 10/2019 | Wang ................ H04W 56/0045 |
| 2021/0037490 A1 | 2/2021 | Wan et al. |
| 2021/0321464 A1* | 10/2021 | Lin ......................... H04W 76/11 |
| 2022/0086786 A1* | 3/2022 | Narasimha ........ H04W 56/0005 |

FOREIGN PATENT DOCUMENTS

| CN | 101562489 A | 10/2009 |
| CN | 104852761 A | 8/2015 |
| CN | 106998237 A | 8/2017 |
| CN | 108781474 A | 11/2018 |
| CN | 110418402 A | 11/2019 |
| CN | 110492965 A | 11/2019 |
| CN | 110912635 A | 3/2020 |

(Continued)

OTHER PUBLICATIONS

International Search Report and Written Opinion received for Application No. PCT/CN2020/107156 mailed Apr. 27, 2021 (6 pages).

(Continued)

*Primary Examiner* — Jason E Mattis
(74) *Attorney, Agent, or Firm* — Crowell & Moring LLP

(57) ABSTRACT

A wireless communication method for use in a wireless terminal is disclosed. The wireless communication method comprises determining at least one synchronization value based on at least one time stamp, and transmitting, to a wireless network node, a signal based on the at least one synchronization value.

17 Claims, 8 Drawing Sheets

(56) References Cited

FOREIGN PATENT DOCUMENTS

| EP | 3 550 899 A1 | 10/2019 |
| JP | 2017-502540 A | 1/2017 |
| WO | WO 2019/191969 A1 | 10/2019 |
| WO | WO 2020/031120 A2 | 2/2020 |
| WO | WO 2020/146506 A2 | 7/2020 |
| WO | WO 2021/109466 A1 | 6/2021 |
| WO | WO 2021/196946 A1 | 10/2021 |
| WO | WO 2021/249206 A1 | 12/2021 |

OTHER PUBLICATIONS

Extended European Search Report received for EP Application No. 20948655.4 mailed Nov. 11, 2022 (11 pages).
Office Action for Japanese Patent Application No. 2022-540485 mailed Jul. 2, 2024, with English trandlation (9 pp.).
Office Action for China Patent Application No. 202080101353.4 mailed Jul. 15, 2024, with English translation (16 pp.).
Wu, Ning et al., Research and Realization of the High Accuracy GPS Synchronization Clock, Automation of Electric Power Systems, Vol. 32, No. 10, May 25, 2008 (no English translation) (5 pp.).

\* cited by examiner

METHOD FOR TIME INFORMATION INDICATION

PRIORITY

This application claims priority as a Continuation of PCT/CN2020/107156, filed on Aug. 5, 2020, entitled "A METHOD FOR TIME INFORMATION INDICATION", published as WO 2022/027333 A1, the entirety of which is incorporated herein by reference.

TECHNICAL FIELD

This document is directed generally to wireless communications.

BACKGROUND

NTN (non-terrestrial network) is an attractive architecture to cover devices in remote areas. However, the large Doppler shift and transmission delay may be difficult to be handled by traditional random access (e.g. physical random access channel (PRACH)) procedure.

In terrestrial network, e.g., high speed train and V2X application, similar issues with regard to the Doppler shift also arise.

In particular, in either terrestrial or non-terrestrial network, the timing of a base station (BS) and a user equipment (UE) may be provided by Global navigation satellite system (GNSS). As a result, the BS and the UE may obtain the same absolute time with small clock error. Therefore, if the BS transmits a time stamp, the UE is able to know both the transmission and reception time of a signal and accordingly estimate the transmission delay.

However, when long round-trip time (RTT) of the NTN and/or fast changing channel characteristics (e.g. in high speed trans scenario or satellite scenario) are considered, the transmission delay and/or the Doppler shift estimated simply based on the transmission and reception time indicated by single time stamp may deviate from that of real situations.

SUMMARY

Thus, an improved method for time information indication may be required.

This document relates to methods, systems, and devices for time information indication.

The present disclosure relates to a wireless communication method for use in a wireless terminal. The wireless communication method comprises:
  determining at least one synchronization value based on at least one time stamp, and
  transmitting, to a wireless network node, a signal based on the at least one synchronization value.

Various embodiments may preferably implement the following features:

In some embodiments, each of the at least one time stamp indicates at least one of type-A time information or type-B time information.

In some embodiments, the at least one time stamp is indicated in at least one time burst.

In some embodiments, each time burst comprises at least one of:
  a type-1 time stamp indicating type-A time information and type-B time information,
  a type-2 time stamp indicating the type-B time information; or
  a type-3 time stamp indicating the type-A time information.

In some embodiments, the at least one time burst comprises at least one of:
  a type-1 time burst indicating type-A time information and type-B time information,
  a type-2 time burst indicating the type-B time information, or
  a type-3 time burst indicating the type-A information.

In some embodiments, the at least one time burst is periodically transmitted by a configured period or is triggered by a request from the wireless terminal.

In some embodiments, the at least one time stamp of a first time burst is transmitted in different channels.

In some embodiments, the at least one time stamp of the first time burst comprises a type-2 time stamp indicating type-B time information, and the type-2 time stamp is transmitted in at least one of a physical downlink shared channel or a physical downlink control channel.

In some embodiments, the at least one time stamp of the first time burst comprises at least one of a type-1 time stamp indicating type-A time information associated with the first time burst and type-B time information or a type-3 time stamp indicating the type-A time information associated with the first time burst, and at least one of the type-1 time stamp or the type-3 time stamp is transmitted in at least one of a physical downlink shared channel or a system information block.

In some embodiments, type-A information associated with the first time burst is transmitted in at least one of a physical downlink shared channel or a system information block which corresponds to a second time burst associated with the first time burst.

In some embodiments, a part of or all of the at least one time stamp of a third time burst is associated with a plurality of repetitions of one of a first physical downlink shared channel, a physical downlink control channel or a first system information block.

In some embodiments, the at least one time stamp of the third time burst comprises a type-2 time stamp indicating type-B time information, and the type-2 time stamp is associated with one of the plurality of repetitions of one of the first physical downlink shared channel, the physical downlink control channel or the first system information block.

In some embodiments, the at least one time stamp of the third time burst comprises at least one of a type-1 time stamp indicating type-A time information associated with the third time burst and type-B information or a type-3 time stamp indicating the type-A time information, and at least one of the type-1 time stamp or the type-3 time stamp is transmitted in one of a repetition of the first physical downlink shared channel or the first system information block, a second physical downlink shared channel associated with the physical downlink control channel, or a second system information block associated with the plurality of repetitions of the first physical downlink shared channel or the physical downlink control channel.

In some embodiments, type-A information associated with the third time burst is transmitted in at least one of a physical downlink shared channel or a system information block which corresponds to a fourth time burst associated with the third time burst.

In some embodiments, at least one first time unit associated with the type-A time information is greater than at least one second time unit associated with the type-B time information.

In some embodiments, at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units.

In some embodiments, the type-A time information is indicated with a validity time.

In some embodiments, at least one of a basic time unit of the at least one time stamp, an interval between two consecutive time stamps, or a period of transmitting the at least one time stamp is configured by the wireless network node.

In some embodiments, at least one of the basic time unit, the interval or the period is expressed in at least one of days, hours, minutes, seconds, milliseconds, microseconds, ten-nanoseconds, nanoseconds, or system time units.

In some embodiments, the wireless communication method further comprises:
  receiving, from the wireless network node, at least one of error information or compensated information associated with the at least one synchronization value,
  wherein the at least one synchronization value is determined further based on at least one of the error information or the compensated information.

In some embodiments, an uncertainty of the at least one synchronization value is determined based on the error information.

In some embodiments, the at least one synchronization value is determined further based on the compensated information by subtracting at least one compensated value corresponding to the compensated information from the corresponding synchronization value in the at least one synchronization value.

In some embodiments, the at least one time stamp is received from the wireless network node.

In some embodiments, the at least one synchronization value comprises at least one of a timing advanced value or a frequency offset.

In some embodiments, the at least one synchronization value is determined by:

$$TA = 2 \times (t_1 - T_1) + 2 \times (t - t_1) \times \frac{(t_2 - T_2) - (t_1 - T_1)}{t_2 - t_1}$$

wherein TA is a timing advanced value at a time t, $T_1$ is a time of the wireless network node transmitting a first time stamp in a time burst, $t_1$ is a time of the wireless terminal receiving the first time stamp, $T_2$ is a time of the wireless network node transmitting a second time stamp subsequent to the first time stamp in the time burst, and $t_2$ is a time of the wireless terminal receiving the second time stamp.

In some embodiments, the at least one synchronization value is determined by:

$$f = -\frac{(t_2 - T_2) - (t_1 - T_1)}{t_2 - t_1} \times f_c$$

wherein f is a Doppler shift, $f_c$ is the carrier frequency, $T_1$ is a time of the wireless network node transmitting a first time stamp in a time burst of the at least one time burst, $t_1$ is a time of the wireless terminal receiving the first time stamp, $T_2$ is a time of the wireless network node transmitting a second time stamp subsequent to the first time stamp in the time burst, $t_2$ is a time of the wireless terminal receiving the second time stamp.

In some embodiments, a compensated Doppler shift is subtracted from the Doppler shift f.

The present disclosure relates to a wireless communication method for use in a wireless network node. The wireless communication method comprises:
  receiving, from a wireless terminal, at least one synchronization value determined based on at least one time stamp, and
  scheduling, for the wireless terminal, uplink resources by applying the at least one synchronization value.

Various embodiments may preferably implement the following features:

In some embodiments, each of the at least one time stamp indicates at least one of type-A time information or type-B time information.

In some embodiments, the at least one time stamp is indicated in at least one time burst.

In some embodiments, each time burst comprises at least one of:
  a type-1 time stamp indicating type-A time information and type-B time information,
  a type-2 time stamp indicating the type-B time information; or
  a type-3 time stamp indicating the type-A time information.

In some embodiments, the at least one time burst comprises at least one of:
  a type-1 time burst indicating type-A time information and type-B time information,
  a type-2 time burst indicating the type-B time information, or
  a type-3 time burst indicating the type-A information.

In some embodiments, the at least one time burst is periodically transmitted by a configured period or is triggered by a request from the wireless terminal.

In some embodiments, the at least one time stamp of a first time burst is transmitted in different channels.

In some embodiments, the at least one time stamp of the first time burst comprises a type-2 time stamp indicating type-B time information, and the type-2 time stamp is transmitted in at least one of a physical downlink shared channel or a physical downlink control channel.

In some embodiments, the at least one time stamp of the first time burst comprises at least one of a type-1 time stamp indicating type-A time information associated with the first time burst and type-B time information or a type-3 time stamp indicating the type-A time information associated with the first time burst, and at least one of the type-1 time stamp or the type-3 time stamp is transmitted in at least one of a physical downlink shared channel or a system information block.

In some embodiments, type-A information associated with the first time burst is transmitted in at least one of a physical downlink shared channel or a system information block which corresponds to a second time burst associated with the first time burst.

In some embodiments, a part of or all of the at least one time stamp of a third time burst is associated with a plurality of repetitions of one of a first physical downlink shared channel, a physical downlink control channel or a first system information block.

In some embodiments, the at least one time stamp of the third time burst comprises a type-2 time stamp indicating type-B time information, and the type-2 time stamp is associated with one of the plurality of repetitions of one of the first physical downlink shared channel, the physical downlink control channel or the first system information block.

In some embodiments, the at least one time stamp of the third time burst comprises at least one of a type-1 time stamp indicating type-A time information associated with the third time burst and type-B information or a type-3 time stamp indicating the type-A time information, and at least one of the type-1 time stamp or the type-3 time stamp is transmitted in one of a repetition of the first physical downlink shared channel or the first system information block, a second physical downlink shared channel associated with the physical downlink control channel, or a second system information block associated with the plurality of repetitions of the first physical downlink shared channel or the physical downlink control channel.

In some embodiments, type-A information associated with the third time burst is transmitted in at least one of a physical downlink shared channel or a system information block which corresponds to a fourth time burst associated with the third time burst.

In some embodiments, at least one first time unit associated with the type-A time information is greater than at least one second time unit associated with the type-B time information.

In some embodiments, at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units.

In some embodiments, the type-A time information is indicated with a validity time.

In some embodiments, at least one of a basic time unit of the at least one time stamp, an interval between two consecutive time stamps, or a period of transmitting the at least one time stamp is configured by the wireless network node.

In some embodiments, at least one of the basic time unit, the interval or the period is expressed in at least one of days, hours, minutes, seconds, milliseconds, microseconds, ten-nanoseconds, nanoseconds, or system time units.

In some embodiments, the wireless communication method further comprises transmitting, to the wireless terminal, a configuration associated with at least one of a basic time unit of the at least one time stamp, an interval between two consecutive time stamps, or a period of transmitting the at least one time stamp.

In some embodiments, at least one of the basic time unit, the interval or the period is expressed in at least one of milliseconds, microseconds, ten-nanoseconds, nanoseconds, or system time units.

In some embodiments, the wireless communication method further comprises:
transmitting, to the wireless terminal, at least one of error information or compensated information associated with the at least one synchronization value,
wherein the at least one synchronization value is determined further based on at least one of the error information or the compensated information.

In some embodiments, an uncertainty of the at least one synchronization value is determined based on the error information.

In some embodiments, the at least one synchronization value is determined further based on the compensated information by subtracting at least one compensated value corresponding to the compensated information from the corresponding synchronization value in the at least one synchronization value.

In some embodiments, the wireless communication further comprises transmitting, to the wireless terminal, the at least one time stamp.

In some embodiments, the at least one synchronization value comprises at least one of a timing advanced value or a frequency offset.

In some embodiments, the at least one synchronization value is determined by:

$$TA = 2 \times (t_1 - T_1) + 2 \times (t - t_1) \times \frac{(t_2 - T_2) - (t_1 - T_1)}{t_2 - t_1}$$

wherein TA is a timing advanced value at a time t, $T_1$ is a time of the wireless network node transmitting a first time stamp in a time burst, $t_1$ is a time of the wireless terminal receiving the first time stamp, $T_2$ is a time of the wireless network node transmitting a second time stamp subsequent to the first time stamp in the time burst, and $t_2$ is a time of the wireless terminal receiving the second time stamp.

In some embodiments, the at least one synchronization value is determined by:

$$f = -\frac{(t_2 - T_2) - (t_1 - T_1)}{t_2 - t_1} \times f_c$$

wherein f is a Doppler shift, $f_c$ is the carrier frequency, $T_1$ is a time of the wireless network node transmitting a first time stamp in a time burst of the at least one time burst, $t_1$ is a time of the wireless terminal receiving the first time stamp, $T_2$ is a time of the wireless network node transmitting a second time stamp subsequent to the first time stamp in the time burst, $t_2$ is a time of the wireless terminal receiving the second time stamp.

In some embodiments, a compensated Doppler shift is subtracted from the Doppler shift f.

The present disclosure relates to a wireless terminal, comprising:
a processor, configured to determine at least one synchronization value based on at least one time stamp, and
a communication unit, configured to transmit, to a wireless network node, a signal based on the at least one synchronization value.

Various embodiments may preferably implement the following feature:
In some embodiments, the processor is further configured to perform a wireless communication method of any of the foregoing described methods.

The present disclosure relates to a wireless network node, comprising:
a communication unit, configured to receive, from a wireless terminal, at least one synchronization value determined based on at least one time stamp, and
a processor, configured to schedule, for the wireless terminal, uplink resources by applying the at least one synchronization value.

Various embodiments may preferably implement the following feature:
In some embodiments, the processor is further configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1:
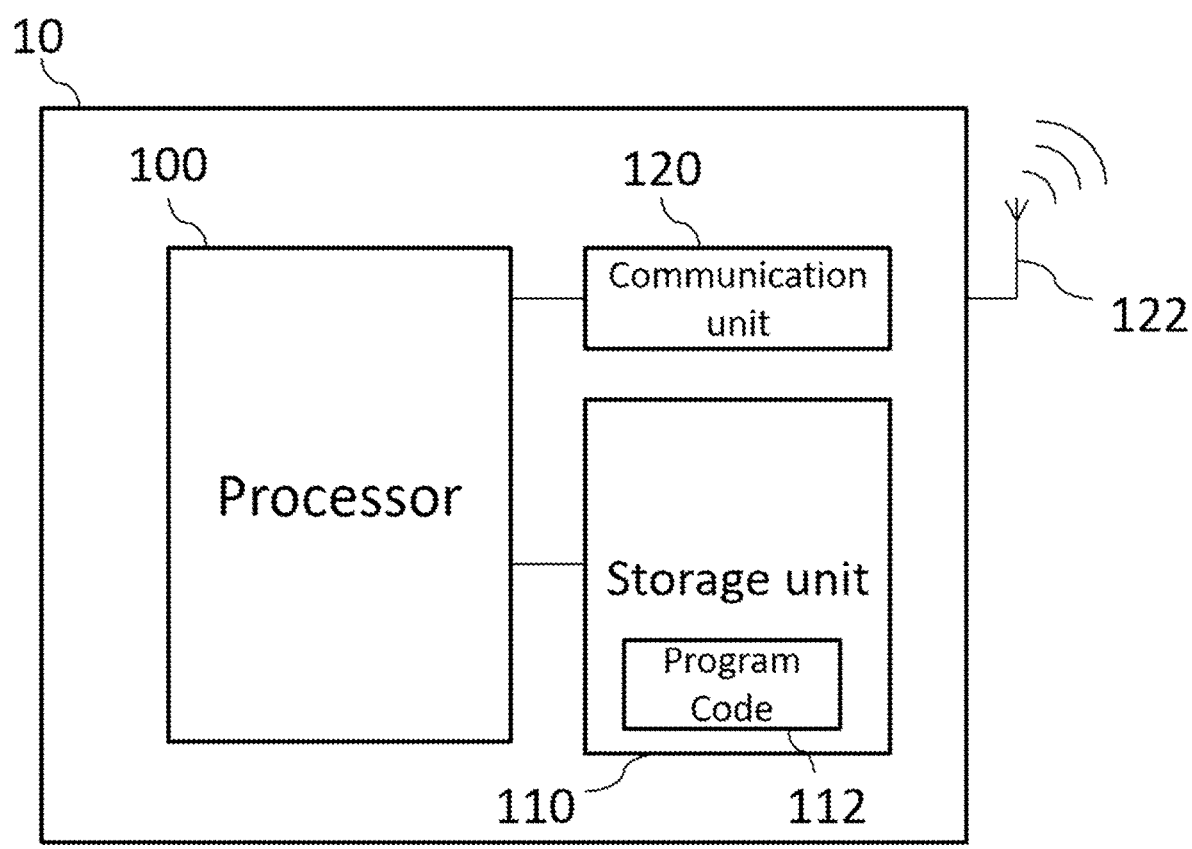
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 110 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
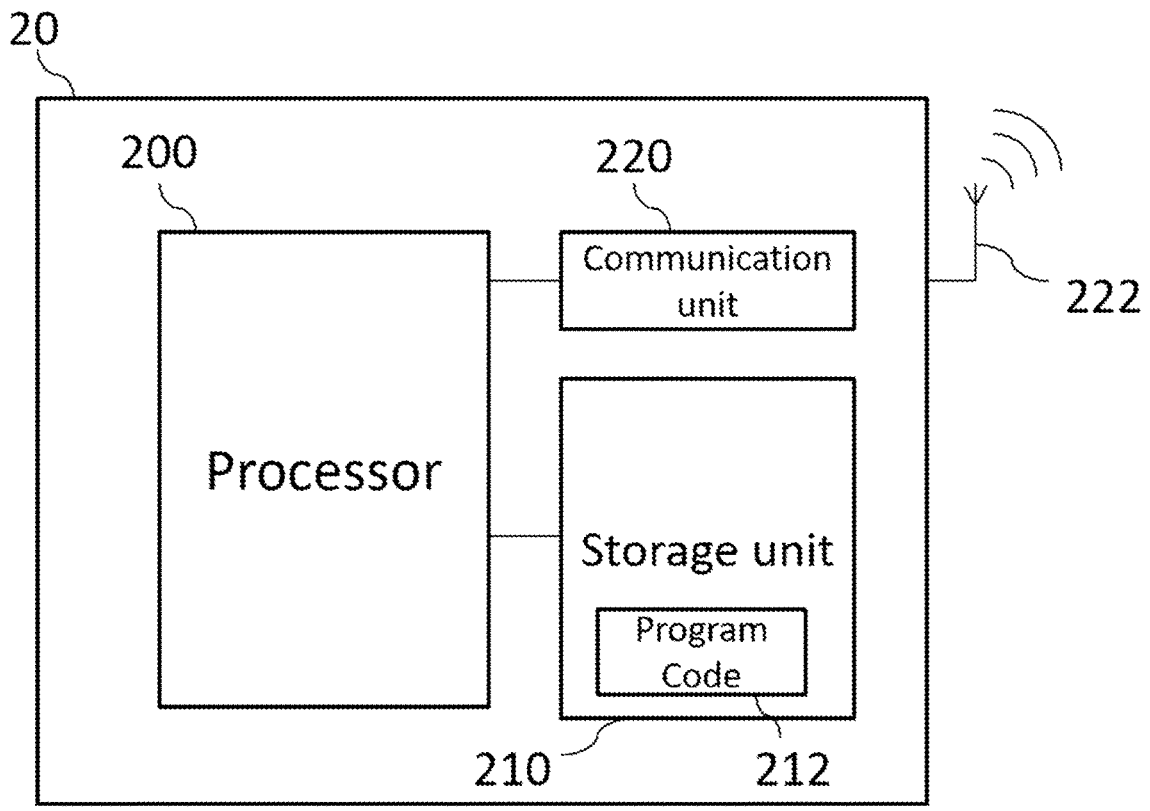
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 210 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

Embodiment 1

In an embodiment, when timing advance (TA) and/or Doppler shift is required to be estimated, at least two time stamps may be needed to be indicated from BS to UE. This series of time stamps may be bundled and regarded as a burst transmission of time information.

In an embodiment, each time stamp refers to the absolute time for a transmission instant, e.g. the starting or ending of the symbol, slot, subframe, half frame, or frame carried in each transmission.

Embodiment 1-1

In order to avoid significant Doppler drift, i.e. variation of timing drift rate, during estimation, the interval between time stamps within one burst may be small. As a result, a large (e.g. coarse) part of time information of the time stamps, e.g. hour, day, month, and/or year, are invariant. To save signaling, the invariant component of time information, i.e. coarse-scale component, is indicated only once, while the variant components, i.e. fine-scale components, are independently (e.g. separately) indicated for different time stamps according to an embodiment. In the present disclosure the coarse-scale component (e.g. coarse-scale time information) may be called as type-A time information and the fine-scale component (e.g. fine-scale time information) may be called as type-B time information.

In an embodiment, at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units.

In an embodiment, the system time units may be one of Tc or Ts.

In an embodiment, $T_c=1/(\Delta f_{max} \cdot N_f)$ where $\Delta f_{max}=480 \cdot 10^3$ Hz and $N_f=4096$.

In an embodiment, $T_s=1/(\Delta f_{ref} \cdot N_{f,ref})$ where $\Delta f_{ref}=15 \cdot 10^3$ Hz and $N_{f,ref}=2048$.

In an embodiment, the time units associated with the type-A and type-B time information may be arbitrary configured time lengths.

Figure 3:
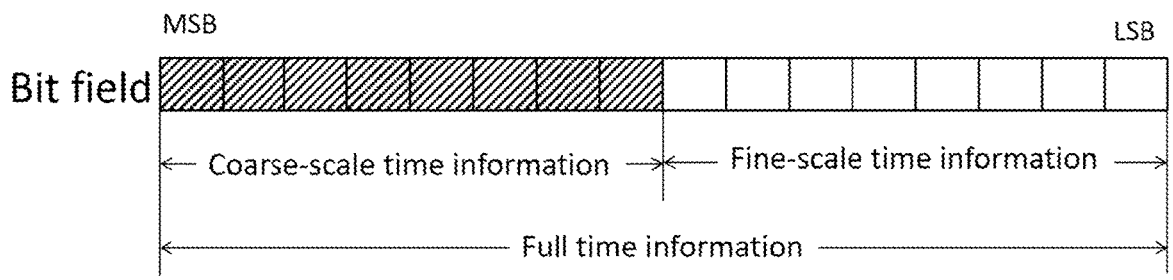
FIG. 3 illustrates the division of time information according to an embodiment of the present disclosure.
Figure 4:
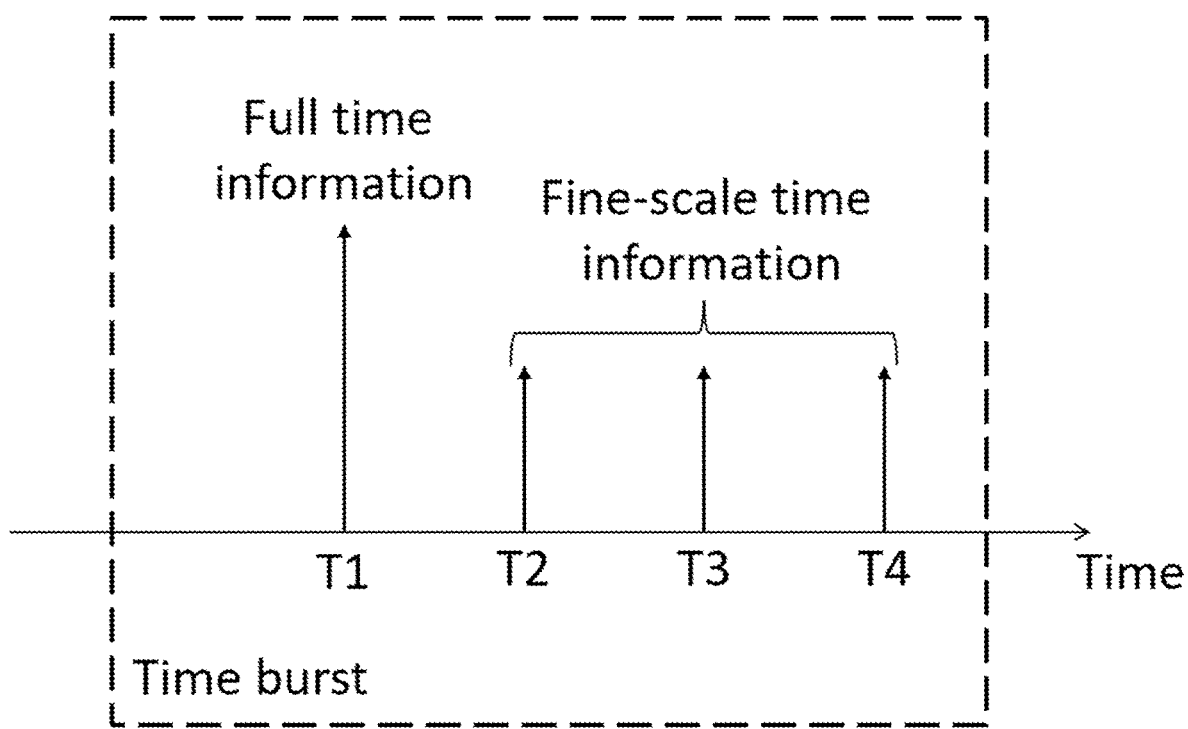
FIG. 4 illustrates an example of time information burst according to an embodiment of the present disclosure.

An example for division of time information is shown in FIG. 3 and an example of a burst is shown in FIG. 4 according to an embodiment of the present disclosure. In FIG. 3, the full time information may be expressed by a string of bits. The type-A time information may correspond to the MSB (most significant bit) part (e.g. the first half of the bit field) of the bit string and type-B time information may correspond to the LSB (least significant bit) part (e.g. the second half of the bit field). In FIG. 4, the full time information of T2-T4 can be obtained by combining their fine-scale components with the coarse-scale component of T1. More specifically, the full-time information of T1 may be indicated by a type-1 time stamp and each of fine-scale scale information is indicated by a type-2 time stamp.

In an embodiment, a type-3 time stamp may be defined as a time stamp indicates only the coarse-scale time information.

In the present disclosure, the burst may be equal to a time burst or a time information burst.

Embodiment 1-2

Generally, the time information burst (e.g. a time burst) is transmitted with a relatively long period and when requested by the wireless terminal (e.g. the UE) to save signaling. However, the errors of estimated Doppler shift and TA increase with time due to Doppler drift, i.e. variation of timing drift rate, which may be large in certain cases. To handle this problem, different types of bursts may be defined to enable different levels of estimations on TA and Doppler shift according to an embodiment. For example, the following burst types may be defined:

a. Type-1: Complete burst. The complete burst (e.g. Type-1 burst) contains a number of time stamps and full time information, which enables precise estimation on TA and Doppler shift.

b. Type-2: Small burst. The small burst (e.g. Type-2 burst) contains few time stamps and only fine-scale time information, which enables tracking on Doppler shift, i.e. timing drift rate, to reduce estimation error during the interval between adjacent complete bursts.

In an embodiment, a type-3 burst may be defined as a time burst comprises at least one time stamp and only the coarse-scale time information.

Figure 5:
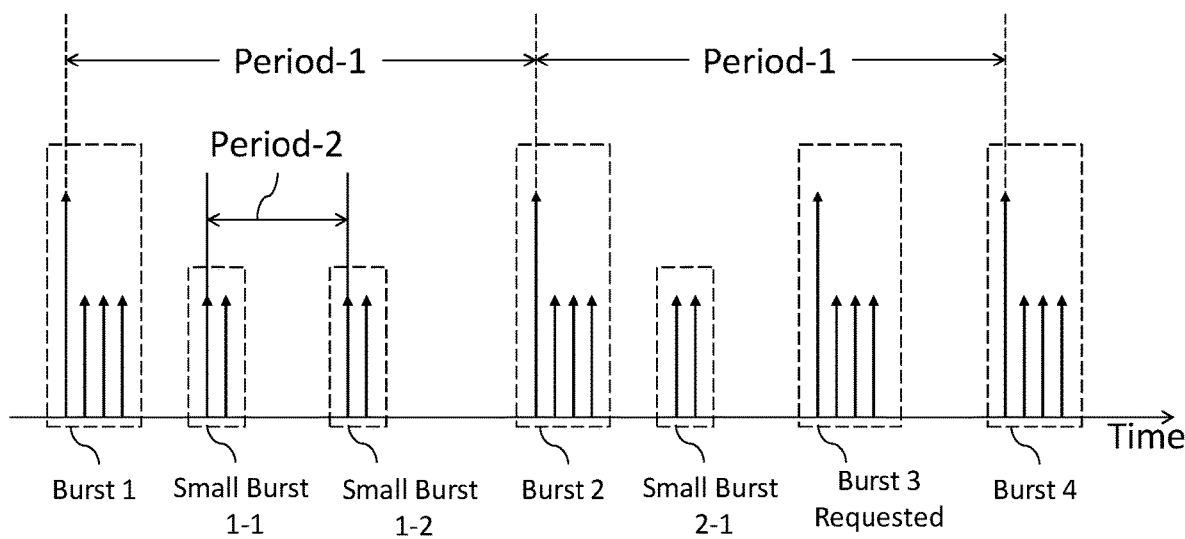
FIG. 5 illustrates the allocation of different burst types according to an embodiment of the present disclosure.

The respective allocation of those burst types is shown in FIG. 5. In the embodiment shown in FIG. 5, the burst 1, 2, 3, and 4 may be type-1 bursts and each of them comprises a type-1 stamp and 3 type-2 stamps. The small burst 1-1, 1-2, and 2-1 may be type-2 bursts and each of them comprises 2 type-2 stamps. The period-1 may refer to the transmission period of type-1 bursts and the period-2 may refer to the transmission period of type-2 bursts. Burst 3 may be a type-1 burst transmitted in response to a request from the wireless terminal. The transmission priority of type-1 burst may be higher than type-2 burst when collision happens.

Embodiment 2

In an embodiment, TA and Doppler shift are estimated at UE side based on the time information indicated from BS. The estimated TA and Doppler shift may be pre-compensated to enhance UL synchronization.

Embodiment 2-1

In wireless communication systems, TA equals to two times the delay between transmit and receive time instant of the same time stamp, which can be expressed as $$TA_0 = 2 \times (t_0 - T_0),$$

where $T_0$ denotes the transmit time of a time stamp and $t_0$ denotes the receive time. Since the delay may vary fast in certain cases, the TA at other time instant may be predicted as $$TA = 2 \times (t_0 - T_0) + 2 \times (t - t_0) \times t'$$

where t denotes the receive time other than $t_0$, and t' denotes the timing drift rate.

Figure 6:
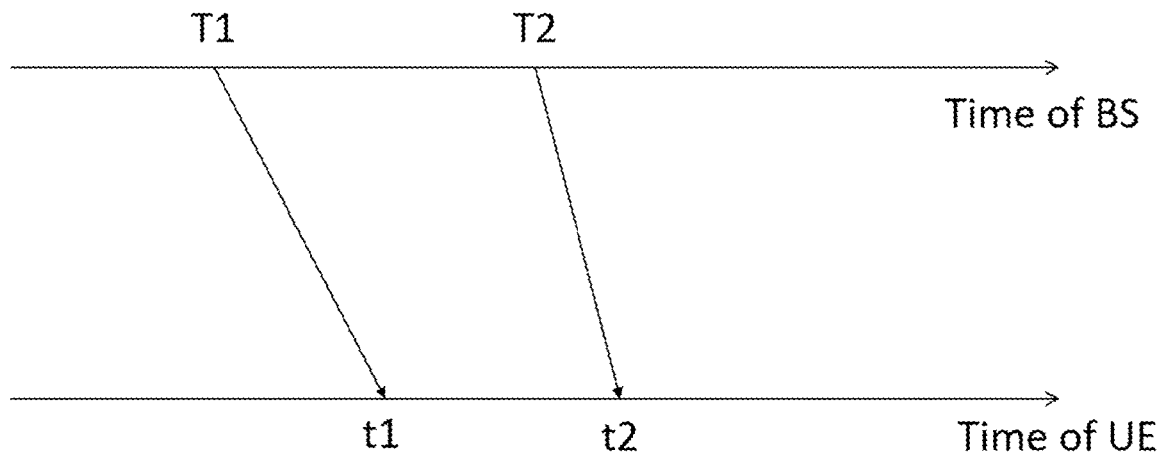
FIG. 6 illustrates the timing of DL signals according to an embodiment of the present disclosure.

Assuming that BS transmits DL signals to UE at time $T_1$ and $T_2$ and UE receives the DL signals at time $t_1$ and $t_2$ as shown in FIG. 6, respectively, wherein the DL signals comprise corresponding timing information of $T_1$ and $T_2$. If time and $T_1$ and $T_2$ are close enough, the timing drift rate may be regarded as invariant and estimated as $$t' = \frac{(t_2 - T_2) - (t_1 - T_1)}{t_2 - t_1}.$$

Correspondingly, the TA at time t is estimated as $$TA = 2 \times (t_1 - T_1) + 2 \times (t - t_1) \times \frac{(t_2 - T_2) - (t_1 - T_1)}{t_2 - t_1}.$$

Embodiment 2-2

Doppler shift is proportional to the timing drift rate. The relationship can be expressed as $$f = -t' \times f_c,$$

where f denotes the Doppler shift and $f_c$ denotes the carrier frequency. Since timing drift rate has been estimated in Embodiment 2-1, the Doppler shift may be estimated as $$f = -t' \times f_c = -\frac{(t_2 - T_2) - (t_1 - T_1)}{t_2 - t_1} \times f_c.$$

In transparent NTN, both feeder link (e.g. link between BS and satellite) and service link (e.g. link between UE and satellite) contribute to timing delay. Therefore, the estimated Doppler shift based on timing drift rate is affected by both feeder and service links, which can be expressed as $$f_{total} = f_{feeder} + f_{service} = -t' \times f_c.$$

Since $f_{feeder}$ is compensated at BS, the Doppler shift for UL pre-compensation, i.e. Doppler shift corresponding to service link, is estimated as $$f_{service} = t' \times f_c - f_{feeder},$$

where $f_{feeder}$ is the compensated feeder-link Doppler shift at the time when transmitting the time information burst and may also be indicated to UE.

Embodiment 3

The time information can be transmitted in different channels, e.g. system information block (SIB), physical downlink shared channel (PDSCH) and/or physical downlink control channel (PDCCH) (e.g. in DCI). Note that PDCCH may schedule either PDSCH or PUSCH. By indicating time information in PDCCH that schedules PUSCH, the estimated TA and Doppler shift may be immediately applied at scheduled PUSCH and DL/UL switch may be avoided.

Embodiment 3-1

Figure 7:
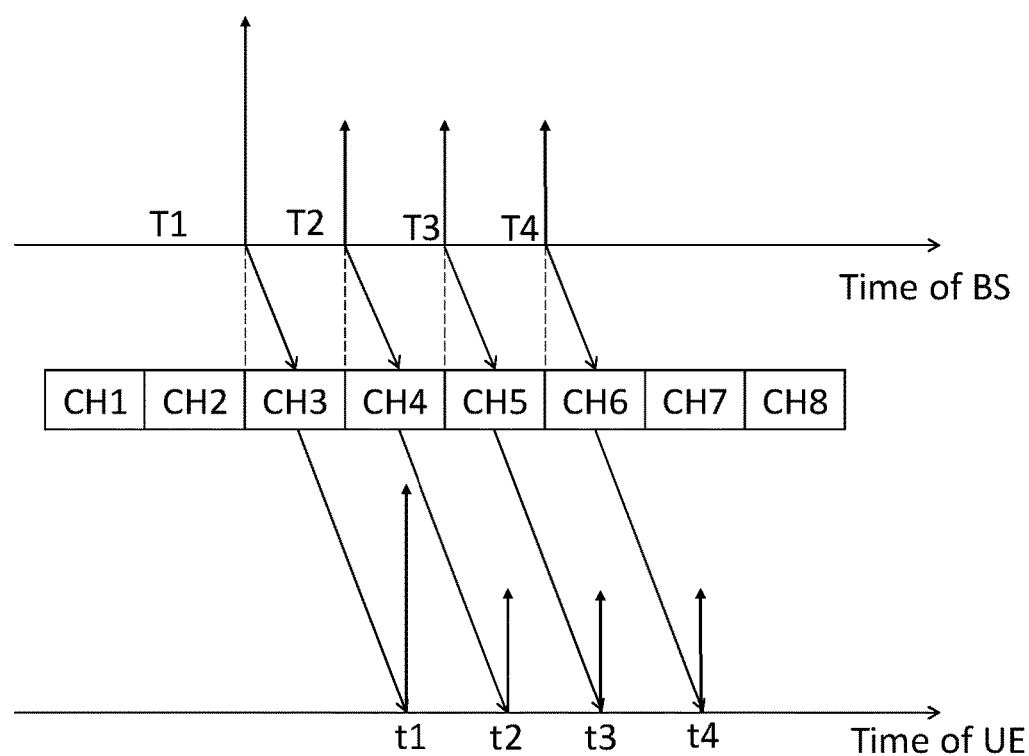
FIG. 7 illustrates time stamps transmitted in different channels according to an embodiment of the present disclosure.

In new radio (NR) and NB-IoT/LTE-M (narrowband internet-of-things/Long Term Evolution for Machines) with small repetition number, the duration of one channel, e.g. one PDSCH, is generally shorter than the interval between time stamps. Therefore, according to an embodiment, the time stamps are transmitted in different channels, e.g. as shown in FIG. 7.

In this case, in accordance with various embodiments, the following options are considered for transmission of time information burst.

According to a first option all components are transmitted in PDSCHs.

For example, one time stamp in a burst may indicate full time information while others in the burst may indicate fine-scale time information. All the information may be indicated through corresponding PDSCHs.

Alternatively, all time stamps in the burst may indicate fine-scale time information through corresponding PDSCHs. The coarse-scale information of the burst may be indicated in an individual PDSCH.

According to a second option, full or coarse-scale time information of a time burst is transmitted in SIB and fine-scale time information of this burst is transmitted in PDSCH For example, one time stamp in the burst may indicate full time information in SIB while others may indicate fine-scale time information in corresponding PDSCHs.

Alternatively, all time stamps may indicate fine-scale time information through corresponding PDSCHs. The coarse-scale information of the burst may be indicated in SIB.

According to a third option, full or coarse-scale time information of a time burst is transmitted in PDSCH and fine-scale time information in this time burst is transmitted in PDCCH(s).

For example, one time stamp in the burst may indicate full time information in PDSCH while others in the burst may indicate fine-scale time information in corresponding PDCCHs.

Alternatively, all time stamps in the burst may indicate fine-scale time information through corresponding PDCCHs. The coarse-scale information of the burst may be indicated in an PDSCH.

According to a fourth option, full or coarse-scale time information of a time burst is transmitted in SIB and fine-scale time information of the time burst is transmitted in PDCCH(s).

For example, one time stamp in the burst may indicate full time information in SIB while others in the burst may indicate fine-scale time information in corresponding PDCCHs.

Alternatively, all time stamps in the burst may indicate fine-scale time information through corresponding PDCCHs. The coarse-scale information of the time burst may be indicated in SIB.

In an embodiment, the time stamps in a time burst may only indicate coarse-scale information.

In an embodiment, the coarse-scale information associates with a validity time and may be used by multiple time bursts.

In an embodiment, the coarse-scale information of the time burst may be indicated in another associated time burst.

Embodiment 3-2

Figure 8:
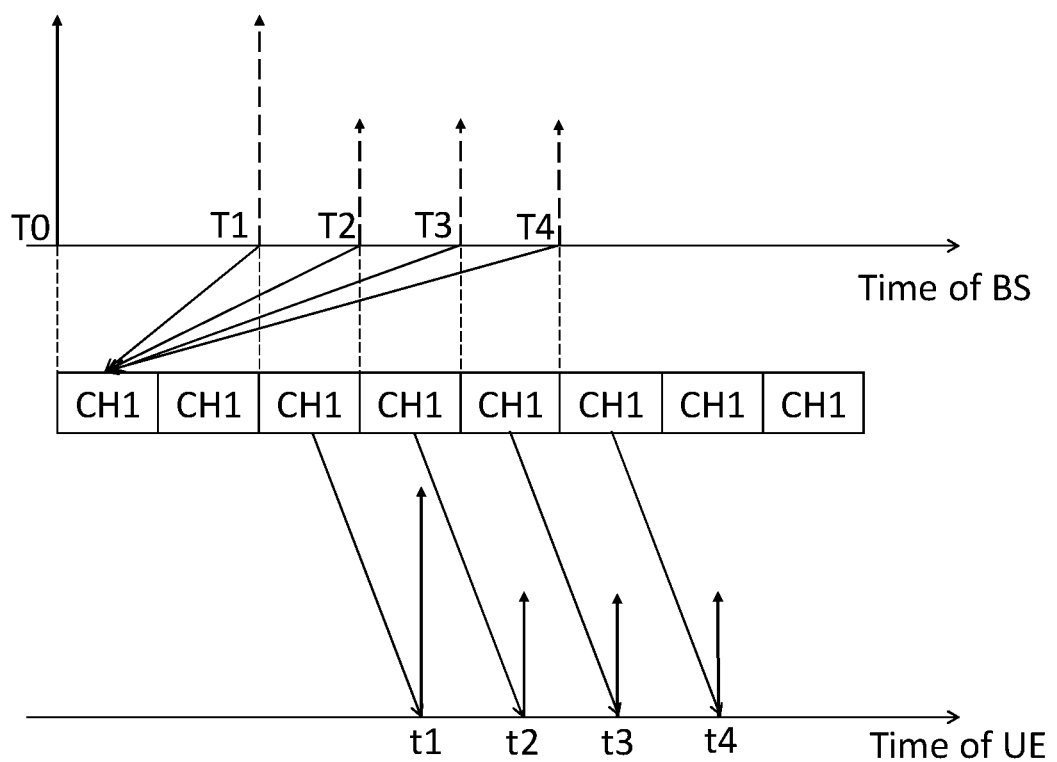
FIG. 8 illustrates time stamps transmitted in the same channel according to an embodiment of the present disclosure.

When the repetition number is too large in NB-IoT/LTE-M, the transmit content will keep invariant for a long time so that different time stamps cannot be timely indicated by different channels. In an embodiment, the timing of (transmitting) repetitions within one bundle may be predicted by the BS. By being indicated predicted time information in the repeated transmission, the UE may obtain multiple time stamps within the same repetition bundle. For example, as shown in FIG. 8, T0 is the beginning time of the repetition bundle and T1-T4 corresponding to (e.g. associated with) the third repetition to the sixth repetition of CH1 are predicted according to T0. For example, T1 to T4 may be associated with the beginning times of the third repetition to the sixth repetition of CH1, respectively. In an embodiment, CH1 may be one of PDSCH, PDCCH, or SIB. The predicted time stamps are separately transmitted in repetitions of the same channel. UE may therefore obtain the transmit time corresponding to t1-t4.

In this case, in accordance with various embodiments, the following options are considered for transmission of time information burst.

According to a first option, all components are transmitted in (repetitions of) PDSCH.

The time stamps within the same bundle (e.g. the same time burst) are predicted based on the first repetition of PDSCH bundle. The information of these time stamps is indicated in every repetition of PDSCH.

According to a second option, full or coarse-scale time information of a time burst is transmitted in SIB and fine-scale time information of the time burst is transmitted in PDSCH.

For example, one time stamp may indicate full time information of the time burst in SIB near (e.g. associated with) the PDSCH bundle while others of the time burst may indicate fine-scale time information of corresponding repetition of PDSCH.

Alternatively, the coarse-scale information of the time burst may be indicated in SIB near the PDSCH bundle. Only fine-scale time information of all time stamps of the time burst may be indicated in (e.g. associated with) every repetition of PDSCH.

According to a third option, full or coarse-scale time information of the time burst is transmitted in PDSCH and fine-scale time information of the time burst is transmitted in PDCCH.

For example, one time stamp of the time burst may indicate full time information in PDSCH associated with the PDCCH bundle while others of the time burst may indicate fine-scale time information in every repetition of PDCCH. For example, the PDSCH whose full time information is indicated by the time stamp in the time burst may be scheduled by the PDCCH bundle or scheduled before the PDCCH bundle.

Alternatively, the coarse-scale information of the time burst may be indicated in PDSCH associated with (e.g. scheduled by or scheduled before) the PDCCH bundle. Only fine-scale time information of all time stamps in the time burst may be indicated in every repetition of PDCCH.

According to a fourth option, full or coarse-scale time information of the time burst is transmitted in SIB and fine-scale time information of the time burst is transmitted in PDCCH.

For example, one time stamp of the time burst may indicate full time information in SIB near the PDCCH bundle while others may indicate fine-scale time information of the time burst in every repetition of PDCCH.

Alternatively, the coarse-scale information of the time burst may be indicated in SIB near the PDCCH bundle (e.g. the most recent SIB or the SIB associated with the PDCCH bundle). Only fine-scale time information of all time stamps in the time burst may be indicated in every repetition of PDCCH.

According to a fifth option, all components of the time burst are transmitted in SIB.

The time stamps within one burst are predicted based on the beginning of SIB. The information of these time stamps is indicated in (repetitions of) the SIB.

In an embodiment, the time stamps in a time burst may only indicate coarse-scale information.

In an embodiment, the coarse-scale information associates with a validity time and may be used by multiple time bursts.

In an embodiment, the coarse-scale information of the time burst may be indicated in another associated time burst.

In an embodiment, the time stamps in a time burst could be associated with more than one repetition bundles.

Embodiment 3-3

The following parameters may be configured for time information burst according to an embodiment.

a. Time unit: with smaller time unit, the granularity of estimation is smaller, which brings smaller residual error. The bit number required for indication of time information is larger.

b. Period of time stamps within one burst: with larger interval between time stamps, the granularity of estimation is smaller, which brings smaller residual error and larger number of indication bits. However, since Doppler shift also drifts, i.e. timing drift rate is varied, the estimation errors of Doppler shift and TA may increase if the interval is too large.

c. Period of bursts: with larger period, the signaling overhead is smaller but the estimation errors of Doppler shift and TA may increase.

In an embodiment, the time unit may comprises at least one of days, hours, minutes, seconds, milliseconds, microseconds, ten-nanoseconds (ns), nanoseconds, or system time units. In an embodiment, the system time units may be one of Tc or Ts.

In an embodiment, $T_c = 1/(\Delta f_{max} \cdot N_f)$ where $\Delta f_{max} = 480 \cdot 10^3$ Hz and $N_f = 4096$.

In an embodiment, $T_s = 1/(\Delta f_{ref} \cdot N_{f,ref})$ where $\Delta f_{ref} = 15 \cdot 10^3$ Hz and $N_{f,ref} = 2048$.

In an embodiment, at least one of time unit, period of time stamps within one burst, and period of bursts may be configured according to at least one of carrier frequency, subcarrier spacing (SCS), and Doppler drift rate. For example, since the space in PDSCH or SIB is generally large enough, the time unit may be predefined as a small one, e.g. 10 ns. Moreover, Doppler drift rate is mainly related to the speed and angle between BS and UE so that its upper bound within one beam may be estimated by BS. The target estimation accuracy of TA and Doppler shift are determined by SCS (corresponds to CP length). With known time unit, carrier frequency, and upper bound of Doppler drift rate, the proper period of time stamps within one burst and period of bursts may be obtained and configured, which satisfy the target estimation accuracy of TA and Doppler shift.

Embodiment 3-4

The transmit and receive time of time stamps may contain unpredictable errors caused by, e.g. clock jitter and satellite perturbation, which introduces additional estimation errors on TA and Doppler shift. Therefore, the BS may indicate the additional error information to UE.

UE may obtain the uncertainty of the estimated TA and Doppler shift with additional error information from BS and itself, which may be considered in parameter configuration.

Since the additional error is generally a random variable and modeled with a stable distribution, the corresponding information may be transmitted in the same PDSCH/SIB with coarse/full time information.

Embodiment 3-5

As disclosed above with reference to embodiment 2-2, the feeder-link Doppler shift compensated at BS side may be indicated to UE. Since Doppler drift is assumed small enough during estimation, the feeder-link Doppler shift may be regarded as invariant during a time information burst. Therefore, the compensated Doppler shift at BS in transparent NTN may be indicated once per burst through SIB, PDSCH, or PDCCH.

In summary, the as apparent from the foregoing description, embodiments comprise one or more of the following aspects: form of time information burst, i.e. transmission and configuration of time information burst, timing information category, e.g. at least split as coarse and fine granularity, wherein multiple level is also possible, and a method of estimating TA and Doppler shift based on time information.

Figure 9:
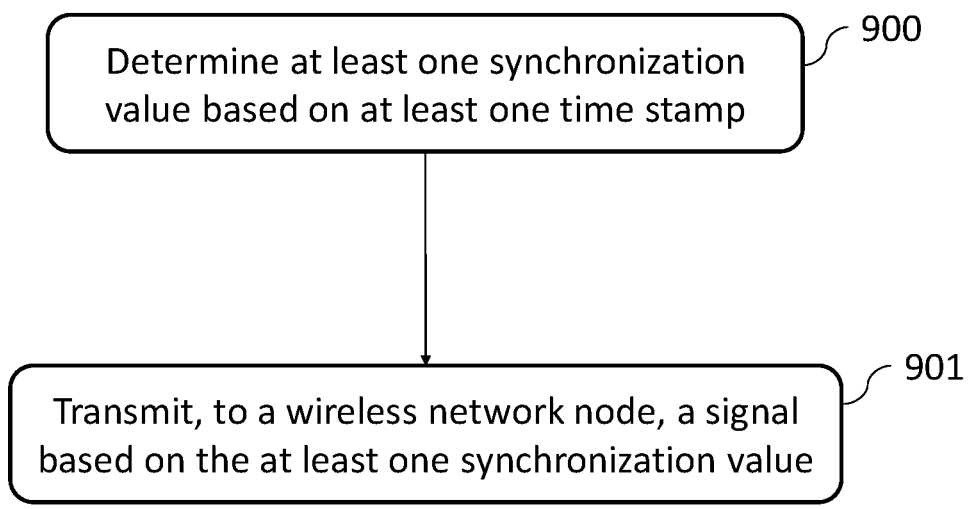
FIG. 9 shows a flowchart of a process according to an embodiment of the present disclosure.

FIG. 9 shows a flowchart of a process according to an embodiment of the present disclosure. The process shown in FIG. 9 may be used in a wireless terminal (e.g. UE) and comprises the following steps:

Step 900: Determine at least one synchronization value based on at least one time stamp.

Step 901: Transmit, to a wireless network node, a signal based on the at least one synchronization value.

In the process shown in FIG. 9, the wireless terminal determines at least one synchronization value based on at least one time stamp. Based on the determined at least one synchronization value, the wireless terminal transmits a signal (e.g. data) to a wireless network node (e.g. BS).

In an embodiment, each of the at least one time stamp indicates at least one of type-A time information (e.g. coarse-scale time information) or type-B time information (e.g. find-scale time information).

In an embodiment, the at least one time stamp is indicated in at least one time burst (e.g. at least one time information burst).

In an embodiment, each time burst comprises at least one of:
- a type-1 time stamp indicating type-A time information and type-B time information,
- a type-2 time stamp indicating type-B time information; or
- a type-3 time stamp indicating type-A time information.

In an embodiment, the at least one time burst comprises at least one of:
- a type-1 time burst indicating type-A time information and type-B time information,
- a type-2 time burst indicating the type-B time information, or
- a type-3 time burst indicating the type-A information.

In an embodiment, the at least one time burst is periodically transmitted by a configured period or is triggered by a request from the wireless terminal.

In an embodiment, the at least one time stamp of a first time burst is transmitted in different channels.

In an embodiment, the at least one time stamp of the first time burst comprises a type-2 time stamp indicating type-B time information, and the type-2 time stamp is transmitted in at least one of a PDSCH or a PDCCH.

In an embodiment, the at least one time stamp of the first time burst comprises at least one of a type-1 time stamp indicating type-A time information associated with the first time burst and type-B time information or a type-3 time stamp indicating the type-A time information associated with the first time burst, and at least one of the type-1 time stamp or the type-3 time stamp is transmitted in at least one of a PDSCH or a SIB.

In an embodiment, type-A information associated with the first time burst is transmitted in at least one of a PDSCH or a SIB which corresponds to a second time burst associated with the first time burst.

In an embodiment, the at least one time stamp of a third time burst is associated with a plurality of repetitions of one of a first PDSCH, a PDCCH or a first SIB.

In an embodiment, the at least one time stamp of the third time burst comprises a type-2 time stamp indicating type-B time information, and the type-2 time stamp is associated with one of the plurality of repetitions of one of the first PDSCH, the PDCCH or the first SIB.

In an embodiment, the at least one time stamp of the third time burst comprises at least one of a type-1 time stamp indicating type-A time information associated with the third time burst and type-B information or a type-3 time stamp indicating the type-A time information, and at least one of the type-1 time stamp or the type-3 time stamp is transmitted in one of a repetition of the first PDSCH or the first SIB, a second PDSCH associated with (e.g. scheduled by or scheduled before) the PDCCH, or a second SIB associated with the plurality of repetitions of the first PDSCH or the PDCCH.

In an embodiment, type-A information associated with the third time burst is transmitted in at least one of a PDSCH or a SIB which corresponds to a fourth time burst associated with the third time burst.

In an embodiment, at least one first time unit associated with the type-A time information is greater than at least one second time unit associated with the type-B time information.

In an embodiment, at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units.

In an embodiment, the type-A time information is indicated with a validity time.

In an embodiment, at least one of a basic time unit of the at least one time stamp, an interval between two consecutive time stamps, or a period of transmitting the at least one time stamp is configured by the wireless network node.

In an embodiment, at least one of the basic time unit, the interval or the period is expressed in at least one of days, hours, minutes, seconds, milliseconds, microseconds, ten-nanoseconds, nanoseconds, or system time units.

In an embodiment, the wireless terminal receives at least one of error information or compensated information associated with the at least one synchronization value from the wireless network node. In this embodiment, the at least one synchronization value is determined further based on at least one of the error information or the compensated information.

In an embodiment, an uncertainty of the at least one synchronization value is determined based on the error information.

In an embodiment, the at least one synchronization value is determined further based on the compensated information by subtracting at least one compensated value corresponding to the compensated information from the corresponding synchronization value in the at least one synchronization value.

In an embodiment, the wireless terminal receives the at least one time stamp from the wireless network node.

In an embodiment, the at least one synchronization value comprises at least one of a timing advanced value or a frequency offset.

In an embodiment, the at least one synchronization value is determined by:

$$TA = 2 \times (t_1 - T_1) + 2 \times (t - t_1) \times \frac{(t_2 - T_2) - (t_1 - T_1)}{t_2 - t_1}$$

wherein TA is a timing advanced value at a time t, $T_1$ is a time of the wireless network node transmitting a first time stamp in a time burst, $t_1$ is a time of the wireless terminal receiving the first time stamp, $T_2$ is a time of the wireless network node transmitting a second time stamp subsequent to the first time stamp in the time burst, and $t_2$ is a time of the wireless terminal receiving the second time stamp.

In an embodiment, the at least one synchronization value is determined by:

$$f = -\frac{(t_2 - T_2) - (t_1 - T_1)}{t_2 - t_1} \times f_c$$

wherein f is a Doppler shift, $f_c$ is the carrier frequency, $T_1$ is a time of the wireless network node transmitting a first time stamp in a time burst of the at least one time burst, $t_1$ is a time of the wireless terminal receiving the first time stamp, $T_2$ is a time of the wireless network node transmitting a second time stamp subsequent to the first time stamp in the time burst, $t_2$ is a time of the wireless terminal receiving the second time stamp.

In an embodiment, a compensated Doppler shift is subtracted from the Doppler shift f.

Figure 10:
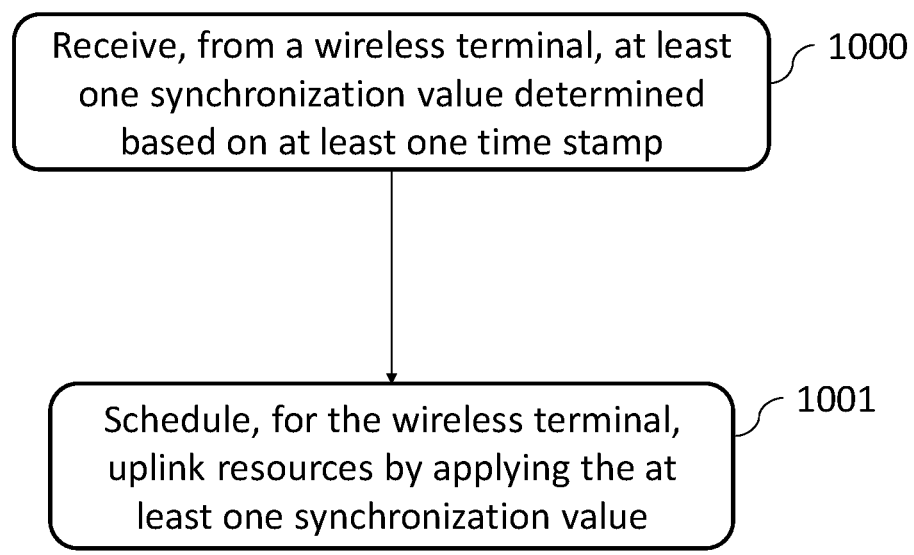
FIG. 10 shows a flowchart of a process according to an embodiment of the present disclosure.

FIG. 10 shows a flowchart of a process according to an embodiment of the present disclosure. The process shown in FIG. 10 may be used in a wireless network node (e.g. BS) and comprises the following steps:

Step 1000: Receive, from a wireless terminal, at least one synchronization value determined based on at least one time stamp.

Step 1001: Schedule, for the wireless terminal, uplink resources by applying the at least one synchronization value.

In the process shown in FIG. 10, the wireless network node may receive at least one synchronization value determined based on at least one time stamp from a wireless terminal (e.g. UE). Based on the received at least one synchronization value, the wireless network node schedules uplink resources for the wireless terminal by applying (e.g. based on) the at least one synchronization value.

In an embodiment, each of the at least one time stamp indicates at least one of type-A time information (e.g. coarse-scale time information) or type-B time information (e.g. find-scale time information).

In an embodiment, the at least one time stamp is indicated in at least one time burst (e.g. at least one time information burst).

In an embodiment, each time burst comprises at least one of:
- a type-1 time stamp indicating type-A time information and type-B time information,
- a type-2 time stamp indicating type-B time information; or
- a type-3 time stamp indicating type-A time information.

In an embodiment, the at least one time burst comprises at least one of:
- a type-1 time burst indicating type-A time information and type-B time information,
- a type-2 time burst indicating the type-B time information, or
- a type-3 time burst indicating the type-A information.

In an embodiment, the at least one time burst is periodically transmitted by a configured period or is triggered by a request from the wireless terminal.

In an embodiment, the at least one time stamp of a first time burst is transmitted in different channels.

In an embodiment, the at least one time stamp of the first time burst comprises a type-2 time stamp indicating type-B time information, and the type-2 time stamp is transmitted in at least one of a PDSCH or a PDCCH.

In an embodiment, the at least one time stamp of the first time burst comprises at least one of a type-1 time stamp indicating type-A time information associated with the first time burst and type-B time information or a type-3 time stamp indicating the type-A time information associated with the first time burst, and at least one of the type-1 time stamp or the type-3 time stamp is transmitted in at least one of a PDSCH or a SIB.

In an embodiment, type-A information associated with the first time burst is transmitted in at least one of a PDSCH or a SIB which corresponds to a second time burst associated with the first time burst.

In an embodiment, the at least one time stamp of a third time burst is associated with a plurality of repetitions of one of a first PDSCH, a PDCCH or a first SIB.

In an embodiment, the at least one time stamp of the third time burst comprises a type-2 time stamp indicating type-B time information, and the type-2 time stamp is associated with one of the plurality of repetitions of one of the first PDSCH, the PDCCH or the first SIB.

In an embodiment, the at least one time stamp of the third time burst comprises at least one of a type-1 time stamp indicating type-A time information associated with the third time burst and type-B information or a type-3 time stamp indicating the type-A time information, and at least one of the type-1 time stamp or the type-3 time stamp is transmitted in one of a repetition of the first PDSCH or the first SIB, a second PDSCH associated with (e.g. scheduled by or schedule before) the PDCCH, or a second SIB associated with the plurality of repetitions of the first PDSCH or the PDCCH.

In an embodiment, type-A information associated with the third time burst is transmitted in at least one of a PDSCH or a SIB which corresponds to a fourth time burst associated with the third time burst.

In an embodiment, at least one first time unit associated with the type-A time information is greater than at least one second time unit associated with the type-B time information.

In an embodiment, at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units.

In an embodiment, the type-A time information is indicated with a validity time.

In an embodiment, the wireless network node configures at least one of a basic time unit of the at least one time stamp, an interval between two consecutive time stamps, or a period of transmitting the at least one time stamp to the wireless terminal.

In an embodiment, at least one of the basic time unit, the interval or the period is expressed in at least one of days, hours, minutes, seconds, milliseconds, microseconds, ten-nanoseconds, nanoseconds, or system time units.

In an embodiment, the wireless network node transmits at least one of error information or compensated information associated with the at least one synchronization value to the wireless terminal. In this embodiment, the at least one synchronization value is determined further based on at least one of the error information or the compensated information.

In an embodiment, an uncertainty of the at least one synchronization value is determined based on the error information.

In an embodiment, the at least one synchronization value is determined further based on the compensated information by subtracting at least one compensated value corresponding to the compensated information from the corresponding synchronization value in the at least one synchronization value.

In an embodiment, the wireless network node transmits the at least one time stamp to the wireless terminal.

In an embodiment, the at least one synchronization value comprises at least one of a timing advanced value or a frequency offset.

In an embodiment, the at least one synchronization value is determined by:

$$TA = 2 \times (t_1 - T_1) + 2 \times (t - t_1) \times \frac{(t_2 - T_2) - (t_1 - T_1)}{t_2 - t_1}$$

wherein TA is a timing advanced value at a time t, $T_1$ is a time of the wireless network node transmitting a first time stamp in a time burst, $t_1$ is a time of the wireless terminal receiving the first time stamp, $T_2$ is a time of the wireless network node transmitting a second time stamp subsequent to the first time stamp in the time burst, and $t_2$ is a time of the wireless terminal receiving the second time stamp.

In an embodiment, the at least one synchronization value is determined by:

$$f = -\frac{(t_2 - T_2) - (t_1 - T_1)}{t_2 - t_1} \times f_c$$

wherein f is a Doppler shift, $f_c$ is the carrier frequency, $T_1$ is a time of the wireless network node transmitting a first time stamp in a time burst of the at least one time burst, $t_1$ is a time of the wireless terminal receiving the first time stamp, $T_2$ is a time of the wireless network node transmitting a second time stamp subsequent to the first time stamp in the time burst, $t_2$ is a time of the wireless terminal receiving the second time stamp.

In an embodiment, a compensated Doppler shift is subtracted from the Doppler shift f.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A wireless communication method for use in a wireless terminal, the wireless communication method comprising:
   determining at least one synchronization value based on at least one time stamp; and
   transmitting, to a wireless network node, a signal based on the at least one synchronization value;
   wherein the at least one time stamp is indicated in at least one time burst;
   wherein the at least one time burst comprises at least one of:
      a type-1 time burst indicating type-A time information and type-B time information,
      a type-2 time burst indicating only the type-B time information, or
      a type-3 time burst indicating only the type-A information,
   wherein each time burst comprises at least one of:
      a type-1 time stamp indicating type-A time information and type-B time information,
      a type-2 time stamp indicating the type-B time information; or
      a type-3 time stamp indicating the type-A time information;
   wherein the at least one time burst is periodically transmitted by a configured period or is triggered by a request from the wireless terminal, and
   wherein a type-2 time burst is received between two type-1 time burst.

2. The wireless communication method of claim 1, wherein each of the at least one time stamp indicates at least one of type-A time information or type-B time information.

3. The wireless communication method of claim 1, wherein the at least one time stamp of a first time burst is transmitted in different channels;
   wherein the at least one time stamp of the first time burst comprises a type-2 time stamp indicating type-B time information, and
   wherein the type-2 time stamp is transmitted in at least one of a physical downlink shared channel or a physical downlink control channel; and
   wherein the at least one time stamp of the first time burst comprises at least one of a type-1 time stamp indicating type-A time information associated with the first time burst and type-B time information or a type-3 time stamp indicating the type-A time information associated with the first time burst, and
   wherein at least one of the type-1 time stamp or the type-3 time stamp is transmitted in at least one of a physical downlink shared channel or a system information block; or
   wherein type-A information associated with the first time burst is transmitted in at least one of a physical downlink shared channel or a system information block which corresponds to a second time burst associated with the first time burst.

4. The wireless communication method of claim 1, wherein a part of or all of the at least one time stamp of a third time burst is associated with a plurality of repetitions of one of a first physical downlink shared channel, a physical downlink control channel or a first system information block;
   wherein the at least one time stamp of the third time burst comprises a type-2 time stamp indicating type-B time information, and
   wherein the type-2 time stamp is associated with one of the plurality of repetitions of one of the first physical downlink shared channel, the physical downlink control channel or the first system information block; and
   wherein the at least one time stamp of the third time burst comprises at least one of a type-1 time stamp indicating type-A time information associated with the third time burst and type-B information or a type-3 time stamp indicating the type-A time information, and
   wherein at least one of the type-1 time stamp or the type-3 time stamp is transmitted in one of a repetition of the first physical downlink shared channel or the first system information block, a second physical downlink shared channel associated with the physical downlink control channel, or a second system information block associated with the plurality of repetitions of the first physical downlink shared channel or the physical downlink control channel; or wherein type-A information associated with the third time burst is transmitted in at least one of a physical downlink shared channel or a system information block which corresponds to a fourth time burst associated with the third time burst.

5. The wireless communication method of claim 2, wherein at least one first time unit associated with the type-A time information is greater than at least one second time unit associated with the type-B time information;
  wherein at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units; and
  wherein the type-A time information is indicated with a validity time.

6. The wireless communication method of claim 1, wherein at least one of a basic time unit of the at least one time stamp, an interval between two consecutive time stamps, or a period of transmitting the at least one time stamp is configured by the wireless network node; and
  wherein at least one of the basic time unit, the interval or the period is expressed in at least one of days, hours, minutes, seconds, milliseconds, microseconds, ten-nanoseconds, nanoseconds, or system time units.

7. The wireless communication method of claim 1, further comprising:
  receiving, from the wireless network node, at least one of error information or compensated information associated with the at least one synchronization value,
  wherein the at least one synchronization value is determined further based on at least one of the error information or the compensated information;
  wherein an uncertainty of the at least one synchronization value is determined based on the error information; and
  wherein the at least one synchronization value is determined further based on the compensated information by subtracting at least one compensated value corresponding to the compensated information from the corresponding synchronization value in the at least one synchronization value.

8. The wireless communication method of claim 1, wherein the at least one time stamp is received from the wireless network node;
  wherein the at least one synchronization value comprises at least one of a timing advanced value or a frequency offset;
  wherein the at least one synchronization value is determined by:

$$TA = 2 \times (t_1 - T_1) + 2 \times (t - t_1) \times \frac{(t_2 - T_2) - (t_1 - T_1)}{t_2 - t_1}$$

wherein TA is a timing advanced value at a time t, $T_1$ is a time of the wireless network node transmitting a first time stamp in a time burst, $t_1$ is a time of the wireless terminal receiving the first time stamp, $T_2$ is a time of the wireless network node transmitting a second time stamp subsequent to the first time stamp in the time burst, and $t_2$ is a time of the wireless terminal receiving the second time stamp;
  wherein the at least one synchronization value is determined by:

$$f = -\frac{(t_2 - T_2) - (t_1 - T_1)}{t_2 - t_1} \times f_c$$

wherein f is a Doppler shift, $f_c$ is the carrier frequency, $T_1$ is a time of the wireless network node transmitting a first time stamp in a time burst of the at least one time burst, $t_1$ is a time of the wireless terminal receiving the first time stamp, $T_2$ is a time of the wireless network node transmitting a second time stamp subsequent to the first time stamp in the time burst, $t_2$ is a time of the wireless terminal receiving the second time stamp; and
  wherein a compensated Doppler shift is subtracted from the Doppler shift f.

9. A wireless communication method for use in a wireless network node, the wireless communication method comprising:
  receiving, from a wireless terminal, at least one synchronization value determined based on at least one time stamp, and
  scheduling, for the wireless terminal, uplink resources by applying the at least one synchronization value;
  wherein the at least one time stamp is indicated in at least one time burst;
  wherein the at least one time burst comprises at least one of:
    a type-1 time burst indicating type-A time information and type-B time information,
    a type-2 time burst indicating only the type-B time information, or
    a type-3 time burst indicating only the type-A information,
  wherein each time burst comprises at least one of:
    a type-1 time stamp indicating type-A time information and type-B time information,
    a type-2 time stamp indicating the type-B time information; or
    a type-3 time stamp indicating the type-A time information;
  wherein the at least one time burst is periodically transmitted by a configured period or is triggered by a request from the wireless terminal, and
  wherein a type-2 time burst is received between two type-1 time burst.

10. The wireless communication method of claim 9, wherein each of the at least one time stamp indicates at least one of type-A time information or type-B time information.

11. The wireless communication method of claim 9, wherein the at least one time stamp of a first time burst is transmitted in different channels;
  wherein the at least one time stamp of the first time burst comprises a type-2 time stamp indicating type-B time information, and
  wherein the type-2 time stamp is transmitted in at least one of a physical downlink shared channel or a physical downlink control channel; and
  wherein the at least one time stamp of the first time burst comprises at least one of a type-1 time stamp indicating type-A time information associated with the first time burst and type-B time information or a type-3 time stamp indicating the type-A time information associated with the first time burst, and
  wherein at least one of the type-1 time stamp or the type-3 time stamp is transmitted in at least one of a physical downlink shared channel or a system information block; or wherein type-A information associated with the first time burst is transmitted in at least one of a physical downlink shared channel or a system information block which corresponds to a second time burst associated with the first time burst.

12. The wireless communication method of claim 9, wherein a part of or all of the at least one time stamp of a third time burst is associated with a plurality of repetitions of one of a first physical downlink shared channel, a physical downlink control channel or a first system information block;
wherein the at least one time stamp of the third time burst comprises a type-2 time stamp indicating type-B time information, and
wherein the type-2 time stamp is associated with one of the plurality of repetitions of one of the first physical downlink shared channel, the physical downlink control channel or the first system information block; and
wherein the at least one time stamp of the third time burst comprises at least one of a type-1 time stamp indicating type-A time information associated with the third time burst and type-B information or a type-3 time stamp indicating the type-A time information, and
wherein at least one of the type-1 time stamp or the type-3 time stamp is transmitted in one of a repetition of the first physical downlink shared channel or the first system information block, a second physical downlink shared channel associated with the physical downlink control channel, or a second system information block associated with the plurality of repetitions of the first physical downlink shared channel or the physical downlink control channel; or
wherein type-A information associated with the third time burst is transmitted in at least one of a physical downlink shared channel or a system information block which corresponds to a fourth time burst associated with the third time burst.

13. The wireless communication method of claim 10, wherein at least one first time unit associated with the type-A time information is greater than at least one second time unit associated with the type-B time information;
wherein at least one first time unit associated with the type-A time information comprises at least one of a day, an hour, a minute or a second and at least one second time unit associated with the type-B time information comprises at least one of a millisecond, a microsecond, ten nanoseconds, a nanosecond, or system time units; and
wherein the type-A time information is indicated with a validity time.

14. The wireless communication method of claim 9, further comprising:
transmitting, to the wireless terminal, a configuration associated with at least one of a basic time unit of the at least one time stamp, an interval between two consecutive time stamps, or a period of transmitting the at least one time stamp; and
wherein at least one of the basic time unit, the interval or the period is expressed in at least one of milliseconds, microseconds, ten-nanoseconds, nanoseconds, or system time units.

15. The wireless communication method of claim 9, further comprising:
transmitting, to the wireless terminal, at least one of error information or compensated information associated with the at least one synchronization value,
wherein the at least one synchronization value is determined further based on at least one of the error information or the compensated information;
wherein an uncertainty of the at least one synchronization value is determined based on the error information; and
wherein the at least one synchronization value is determined further based on the compensated information by subtracting at least one compensated value corresponding to the compensated information from the corresponding synchronization value in the at least one synchronization value.

16. The wireless communication method of claim 9, further comprising:
transmitting, to the wireless terminal, the at least one time stamp;
wherein the at least one synchronization value comprises at least one of a timing advanced value or a frequency offset;
wherein the at least one synchronization value is determined by:

$$TA = 2 \times (t_1 - T_1) + 2 \times (t - t_1) \times \frac{(t_2 - T_2) - (t_1 - T_1)}{t_2 - t_1}$$

wherein TA is a timing advanced value at a time t, $T_1$ is a time of the wireless network node transmitting a first time stamp in a time burst, $t_1$ is a time of the wireless terminal receiving the first time stamp, $T_2$ is a time of the wireless network node transmitting a second time stamp subsequent to the first time stamp in the time burst, and $t_2$ is a time of the wireless terminal receiving the second time stamp;
wherein the at least one synchronization value is determined by:

$$f = -\frac{(t_2 - T_2) - (t_1 - T_1)}{t_2 - t_1} \times f_c$$

wherein f is a Doppler shift, $f_c$ is the carrier frequency, $T_1$ is a time of the wireless network node transmitting a first time stamp in a time burst of the at least one time burst, $t_1$ is a time of the wireless terminal receiving the first time stamp, $T_2$ is a time of the wireless network node transmitting a second time stamp subsequent to the first time stamp in the time burst, $t_2$ is a time of the wireless terminal receiving the second time stamp; and
wherein a compensated Doppler shift is subtracted from the Doppler shift f.

17. A wireless terminal, comprising:
a processor, configured to determine at least one synchronization value based on at least one time stamp; and
a communication unit, configured to transmit, to a wireless network node, a signal based on the at least one synchronization value;
wherein the at least one time stamp is indicated in at least one time burst;
wherein the at least one time burst comprises at least one of:
a type-1 time burst indicating type-A time information and type-B time information,
a type-2 time burst indicating only the type-B time information, or
a type-3 time burst indicating only the type-A information, wherein each time burst comprises at least one of:
  a type-1 time stamp indicating type-A time information and type-B time information,
  a type-2 time stamp indicating the type-B time information; or
  a type-3 time stamp indicating the type-A time information;
wherein the at least one time burst is periodically transmitted by a configured period or is triggered by a request from the wireless terminal, and
wherein a type-2 time burst is received between two type-1 time burst.

* * * * *